US009988484B2

(12) United States Patent
Li et al.

(10) Patent No.: US 9,988,484 B2
(45) Date of Patent: Jun. 5, 2018

(54) CARDANOL MODIFIED EPOXY POLYOL

(71) Applicant: Dow Global Technologies LLC, Midland, MI (US)

(72) Inventors: Wei Li, Shanghai (CN); Yi Zhang, Shanghai (CN); Jiang Li, Shanghai (CN)

(73) Assignee: Dow Global Technologies LLC

( * ) Notice: Subject to any disclaimer, the term of this patent is extended or adjusted under 35 U.S.C. 154(b) by 0 days. days.

(21) Appl. No.: 15/031,822

(22) PCT Filed: Nov. 27, 2013

(86) PCT No.: PCT/CN2013/087974
§ 371 (c)(1),
(2) Date: Apr. 25, 2016

(87) PCT Pub. No.: WO2015/077945
PCT Pub. Date: Jun. 4, 2015

(65) Prior Publication Data
US 2016/0264714 A1 Sep. 15, 2016

(51) Int. Cl.
| | | |
|---|---|---|
| *C08G 18/64* | (2006.01) |
| *C08G 18/58* | (2006.01) |
| *C08G 18/40* | (2006.01) |
| *C08G 18/32* | (2006.01) |
| *C08G 18/76* | (2006.01) |
| *C08G 18/48* | (2006.01) |
| C08G 101/00 | (2006.01) |

(52) U.S. Cl.
CPC ..... *C08G 18/6407* (2013.01); *C08G 18/3215* (2013.01); *C08G 18/4045* (2013.01); *C08G 18/4081* (2013.01); *C08G 18/4829* (2013.01); *C08G 18/58* (2013.01); *C08G 18/581* (2013.01); *C08G 18/7664* (2013.01); *C08G 2101/0008* (2013.01); *C08G 2101/0041* (2013.01); *C08G 2101/0066* (2013.01); *C08G 2190/00* (2013.01); *C08G 2220/00* (2013.01); *C08G 2350/00* (2013.01)

(58) Field of Classification Search
CPC ............ C08G 18/6407; C08G 18/7664; C08G 18/4829; C08G 18/4081; C08G 18/4045; C08G 18/58; C08G 2220/00; C08G 2101/0008; C08G 2101/0066; C08G 18/3215; C08G 18/581; C08G 2190/00; C08G 2101/0041; C08G 2350/00
See application file for complete search history.

(56) References Cited

U.S. PATENT DOCUMENTS

| | | | |
|---|---|---|---|
| 7,393,465 B2 | 7/2008 | Niesten et al. | |
| 7,812,101 B2 | 10/2010 | Fenn et al. | |
| 8,378,135 B2 | 2/2013 | Prasad et al. | |
| 9,580,601 B2* | 2/2017 | Li ............................ | C08L 95/00 |
| 2005/0192423 A1* | 9/2005 | Niesten ................ | C08G 18/283 528/49 |
| 2006/0004115 A1* | 1/2006 | Ittara ...................... | C08G 18/36 521/155 |
| 2009/0020039 A1* | 1/2009 | Fenn ...................... | C08L 63/00 106/218 |
| 2011/0060101 A1* | 3/2011 | Suau ...................... | C08G 18/10 524/590 |
| 2013/0036940 A1 | 2/2013 | Tanaka et al. | |

FOREIGN PATENT DOCUMENTS

| | | |
|---|---|---|
| CN | 102557897 A | 7/2012 |
| CN | 103073689 A | 5/2013 |

OTHER PUBLICATIONS

Suresh K.I., et al; Synthesis, Structure, and Properties of Novel Polyols from Cardanol and Developed Polyurethanes; Ind. Eng. Chem. Res. 2005, p. 4504-4512 V44.
Ionescu, M, et al; Polyols and Rigid Polyurethane Foams from Cashew Nut Shell Liquid, J Polym Environ 2012, p. 647-658.
PCT/CN2013/087974 International Search Report & Written Opinion, dated Aug. 25, 2014.
PCT/CN2013/087974 International Preliminary Report on Patentability dated May 31, 2016.

* cited by examiner

Primary Examiner — Rabon Sergent

(57) ABSTRACT

A reaction system for forming polyurethane elastomers includes a cardanol modified epoxy polyol. In particular, the reaction system has an isocyanate-reactive component that includes the cardanol-modified epoxy polyol and an isocyanate component that includes at least one polyisocyanate. The cardanol-modified epoxy polyol is a reaction product of an epoxy component and an epoxy-reactive component at a ratio of epoxy groups to epoxy reactive groups from 1:1 to 1:5, and the epoxy-reactive component includes a cashew nutshell liquid having a cardanol content of at least 85 wt %, based on a total weight of the cashew nutshell liquid.

12 Claims, No Drawings

CARDANOL MODIFIED EPOXY POLYOL

FIELD

Embodiments relate to a cardanol modified epoxy polyol and to polyurethane elastomers formed using the cardanol modified epoxy polyol.

INTRODUCTION

A polyurethane based product may be formed by reacting an isocyanate with a polyol. The polyol used may have at least one petroleum based building block (such as ethylene oxide and/or propylene oxide). While such petrochemical based polyols are widely used, these polyols face many problems such as exhaustion of natural resources and fluctuations in price based on changes in oil price.

In the epoxy based art of aqueous dispersions and coatings, it has been suggested that petrochemical based resins may be substituted with a biomass based resin that is a reaction product of an epoxy resin and a biomass derived compound such as cardanol at a ratio of epoxy groups to epoxy reactive groups from 1:0.2 to 1:0.8, e.g., as discussed in U.S. Pat. No. 7,812,101. However, such a partially modified biomass based resin may not be suitable for use in the polyurethane art. Accordingly, an epoxy and cardanol based formulation is sought for use as a polyol in the polyurethane art.

SUMMARY

Embodiments may be realized by providing a reaction system for forming polyurethane elastomers that includes an isocyanate-reactive component having a cardanol-modified epoxy polyol and an isocyanate component that includes at least one polyisocyanate. The cardanol-modified epoxy polyol is a reaction product of an epoxy component and an epoxy-reactive component at a ratio of epoxy groups to epoxy reactive groups from 1:0.95 to 1:5. The epoxy-reactive component includes a cashew nutshell liquid having a cardanol content of at least 85 wt %, based on a total weight of the cashew nutshell liquid.

DETAILED DESCRIPTION

A polyurethane product (e.g., a gel polyurethane product) is formed as a reaction product of a mixture that includes an isocyanate component and an isocyanate-reactive component. The isocyanate component includes at least one polyisocyanate and the isocyanate-reactive component includes a polyol component having at least one polyol. According to embodiments, the polyol component includes at least one cardanol-modified epoxy (CME) polyol. The isocyanate component and/or the isocyanate-reactive component may additionally include an optional additive component, which includes an additive such as a curative agent, a catalyst, a surfactant, a plasticizer, a filler, a solvent, a chain extender, and/or a crosslinker.

The CME polyol is a reaction product of a mixture that includes an epoxy component and an epoxy-reactive component that has a cardanol component (and may include an optional phenol or phenol derivative component). The epoxy component and/or the epoxy-reactive component may include an optional additive component (e.g., that may include an additive such as a curative agent, a catalyst, a surfactant, a plasticizer, a filler, a solvent, a chain extender, and/or a crosslinker). A ratio of epoxy groups in the epoxy component to the epoxy reactive groups in the epoxy-reactive component is from 1:0.95 to 1:5.

The epoxy component for forming the CME polyol includes at least one epoxy resin. The at least one epoxy resin may account for 90 wt % to 100 wt % of the epoxy component, with any remainder being a portion or an entirety of the optional additive component. The epoxy-reactive component may include at least 50 wt % (e.g., at least 60 wt %, at least 70 wt %, at least 80 wt %, at least 90 wt %, and/or 100 wt %) of the cardanol component, based on a total weight of the epoxy-reactive component. A remainder of the epoxy-reactive component may be the phenol or phenol derivative component. The cardanol component includes a cashew nutshell liquid (CNSL) that is a by-product of cashew nut processing (e.g., may be extracted from a layer between a nut and a shell of a cashew nut). The CNSL has a cardanol content of at least 85 wt %, based on a total weight of the CNSL, such that the CNSL includes cardanol as a primary component and may additionally include cardol, methylcardol, and/or anacardic acid as secondary components. The CNSL may be subjected to a heating process (e.g., at the time of extraction from the cashew nut), a decarboxylation process, and/or a distillation process.

The CME polyol includes an epoxy derived backbone and at least two secondary isocyanate reactive groups, i.e., secondary hydroxyl groups, for reaction with isocyanate groups in the isocyanate component. The CME polyol may allow for adjustment of curing time, e.g., based on the slower reactivity of secondary isocyanate reactive groups relate to primary isocyanate reactive groups. The epoxy backbone may act as a building block and determine the hydroxyl functionality and chemical structure of the resultant CME polyol. Synthesis of the CME polyol includes a reaction between cardanol in the CNSL and an opened epoxy resin produced from a ring-opening reaction of the epoxy resin in the epoxy component. For example, the CME polyol includes a cardanol linkage with the ring opened epoxy resin, which results in an ether bond between the opened epoxy resin and the cardanol.

According to exemplary embodiments, the CME polyol may include a compound having the following Formula 1 when synthesis is carried out using an epoxy resin, which has two epoxide moieties and a resin backbone, and CNSL, which has therein at least mono-unsaturated cardanol:

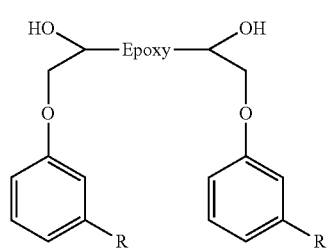

Formula 1

In the above Formula 1, the R groups are independently equal to $C_{15}H_{31-n}$ (in which n=0, 2, 4, or 6) or $C_{17}H_{33-n}$ (in which n=0, 2, or 4). In particular, the R group is independently a saturated or unsaturated straight alkyl chain that includes fifteen or seventeen carbon atoms, and the CME polyol may be derived from a cardanol mixture that variously includes cardanols having different R groups. The Epoxy in Formula 1 is the resin backbone.

According to an exemplary embodiment, the synthesis of a CME polyol using a bisphenol A based diepoxide resin and CNSL that has therein at least mono-unsaturated cardanol, includes the following reaction stage:

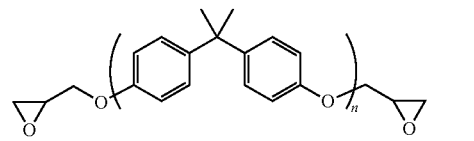

+

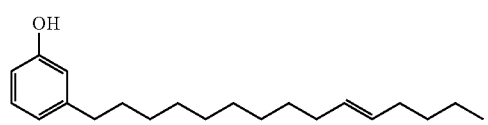

→

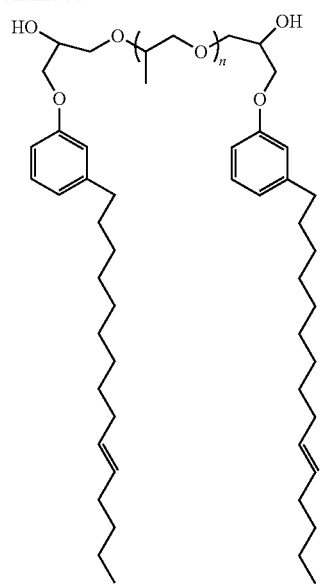

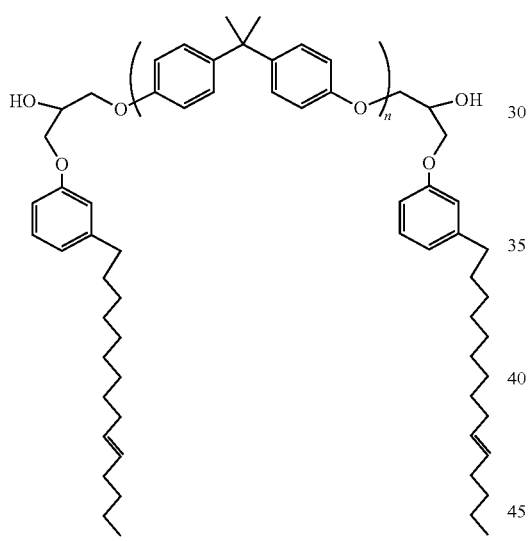

According to another exemplary embodiment, the synthesis of a CME polyol using an aliphatic diepoxide epoxy resin and CNSL that has therein at least mono-unsaturated cardanol, includes the following reaction stage:

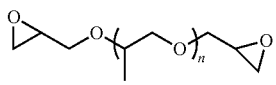

+

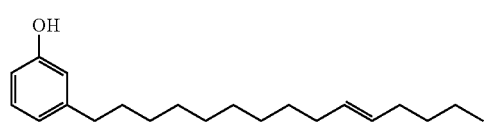

→

Other exemplary CME polyol structures that are synthesized using various aromatic epoxy resins and CNSL that has therein at least mono-unsaturated cardanol include the following:

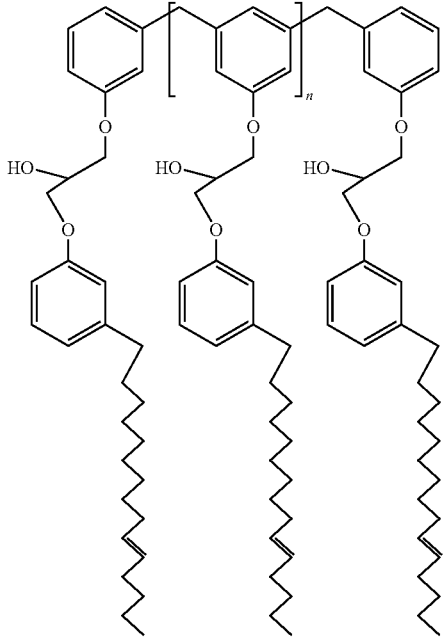

First
CME Polyol

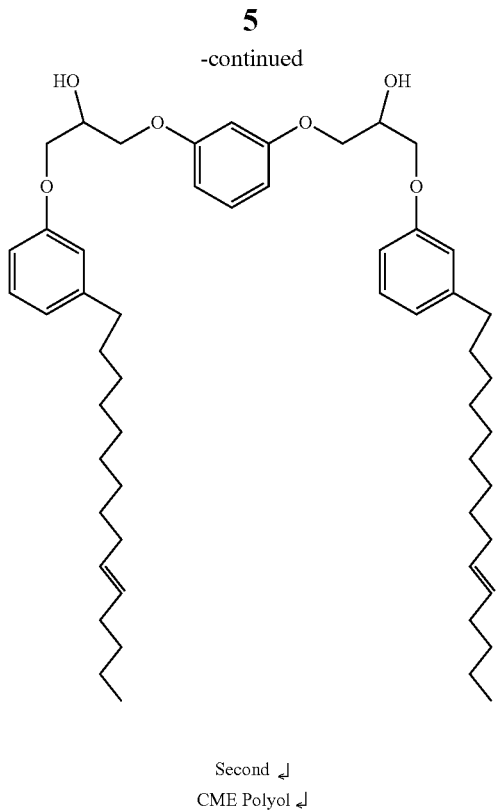

Second
CME Polyol

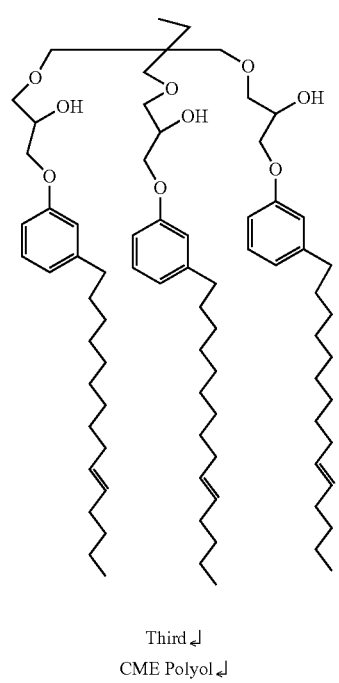 [SMILES: CCCC/C=C/CCCCCCCCCc1cccc(OCC(O)COCC(CC)(COCC(O)COc2cccc(CCCCCCCCC/C=C/CCCC)c2)COCC(O)COc2cccc(CCCCCCCCC/C=C/CCCC)c2)c1]

Third
CME Polyol

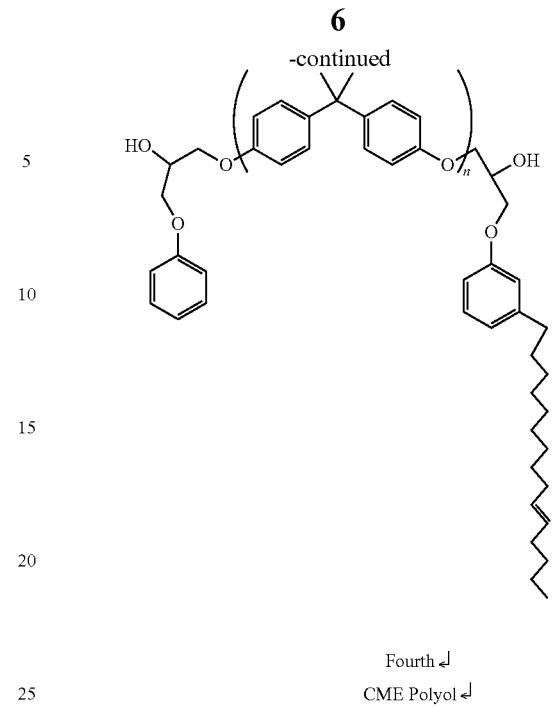

Fourth
CME Polyol

The First CME Polyol, above, is synthesized using an aromatic polyepoxide based resin and mono-unsaturated cardanol. The Second CME Polyol, above, is synthesized using a phenyl diepoxide resin and mono-unsaturated cardanol. The Third CME Polyol, above, is synthesized using an aliphatic polyepoxide based resin and mono-unsaturated cardanol. The Fourth CME Polyol, above, is synthesized using a bisphenol A based diepoxide resin, phenol, and mono-unsaturated cardanol.

Without intending to be bound by this theory, the long chain R group of cardanol in the CME polyol may introduce hydrophobicity into the resultant polyurethane elastomers. The increased hydrophobicity may be expressed as a low water absorbance in humid conditions, e.g., a low water absorbency measured as less than 0.8 wt % (e.g., less than 0.7 wt %) increase in weight of the polyol component at the conditions of 62% humidity and 23° C. for one hour. Further, hydrolysis and bubbling (e.g., the effect of bubbles being generated by carbon dioxide release from a reaction between water and an isocyanate component in the reaction mixture), may be reduced and/or avoided. The epoxy resin derived backbone of the CME polyol may provide property improvements such as mechanical performance and material compatibility to the polyurethane elastomers. Mechanical performance and/or other desired properties of the CME polyol may be adjusted in view of the alkyl chain moiety on the cardanol in the CNSL. Phenol or phenol derivatives added into the reaction mixture for forming the CME polyol may initialize the epoxy group ring-opening reaction, while the CNSL may offer hydrophobicity characteristics and anti-hydrolysis performance.

Exemplary epoxy resins for the epoxy component include polyepoxides that have at least two epoxide moieties per molecule (e.g., the epoxy resin may have a 2 to 10 epoxide functionality, a 2 to 6 epoxide functionality, a 2 to 4 epoxide functionality, etc.). The epoxy resin backbone may be saturated or unsaturated, aliphatic, cycloaliphatic, aromatic, or heterocyclic and may be substituted (e.g., contain at least one substituent such as halogen, hydroxyl, and/or ether groups). The epoxy resin may be monomeric or polymeric.

The epoxy resin may have an equivalent epoxy weight (EEW) from 20 g/eq to 1000 g/eq (e.g., 30 g/eq to 800 g/eq, 50 g/eq to 600 g/eq, 100 g/eq to 500 g/eq, etc.), which EEW is the measure of the number of grams of resin for one chemical equivalent of an epoxy group. Exemplary epoxy resins include bisphenol Adiglycidyl ether, bisphenol F diglycidyl ether, resorcinol diglycidyl ether, and triglycidyl ethers of para-aminophenols. The epoxy resin component may include an epoxy resin that is commercially available, e.g., from The Dow Chemical Company under the tradenames D.E.R. and D.E.N. The viscosity and cost of the resultant CME polyol may be controlled by the choice of the epoxy resin used in the epoxy component.

The CNSL is available, e.g., from HDSG Beijing Technology under the tradenameF-180 series. The CNSL includes at least 85 wt % (e.g., 85 wt % to 100 wt %, 90 wt % to 99 wt %, 91 wt % to 98 wt %, 92 wt % to 98 wt %, 93 wt % to 98 wt %, etc.) of cardanol, based on a total weight of the CNSL. The CNSL may include less than 8.5 wt % (e.g., from 0.5 wt % to 8 wt %, from 0.5 wt % to 5 wt %, 0.5 wt % to 3 wt %, etc.) of cardol, with a remainder based on a total of 100 wt % being methylcardol and/or anacardic acid. According to an exemplary embodiment, the cardanol component consists essentially of a decarboxylated CNSL that includes at least 92 wt % (e.g., 92 wt % to 100 wt %, 94 wt % to 100 wt %, etc.) of cardanol, based on a total weight of the decarboxylated CNSL. The decarboxylated CNSL may be exposed to at least one distillation process.

The optional phenol or phenol derivative component includes at least one phenol and/or at least one phenol derivative. The reaction mixture may include the optional phenol or phenol derivative component at a molar ratio from 0.5:1.5 to 1.5:0.5 (e.g., 0.8:1.2 to 1.2:0.8, 0.9:1.1 to 1.1:0.9, etc.) for the moles of the phenol or phenol derivative to the moles of the CNSL in the reaction mixture. For example, the molar amount of the CNSL used may be reduced based on the molar amount of the phenol or phenol derivative used. Exemplary phenol derivatives include a naphthol based compound, a phenylphenol based compound, and a hexachlorophene based compound.

Exemplary catalysts for the optional additive component include quaternary ammonium compounds, phosphonium compounds, sulfonium compounds, tertiary amines, metal hydroxides, and metal alkoxides. The reaction between the epoxy component and the epoxy reactive component may be carried out neat or in the presence of an inert organic solvent.

Exemplary solvents include ketone (such as methyl isobutyl ketone and/or methyl amyl ketone), toluene, xylene, and glycol ethers (such as the dimethyl ether of diethylene glycol). The reaction for forming the CME polyol may be conducted at a temperature of 120° C. to 180° C., e.g., for 1 hour to 48 hours.

In the reaction mixture for forming the CME polyol, the ratio of epoxy groups in the epoxy component to the epoxy reactive groups in the epoxy-reactive component is from 1:0.95 to 1:5 (e.g., 1:0.98 to 1:4, 1:0.99 to 1:3, 1:1 to 1:2.5, 1:1 to 1:1.1, etc.). For example, the epoxy reactive groups provided from the cardanol component may enable sufficient conversion of the epoxy resin to the CME polyol and/or provide low viscosity to the reaction mixture (which low viscosity also enables sufficient conversion). An epoxy residue left in the resultant reaction product of the reaction mixture for forming the CME polyol, may be less than 0.2 wt %, based on a total weight of the resultant reaction product. For example, an epoxide equivalent weight of the resultant reaction product may be at least 8,000 grams/equivalent (e.g., from 9,000 g/eq to 100,000 g/eq, from 20,000 g/eq to 100,000 g/eq, from 30,000 g/eq to 100,000 g/eq, etc.), as measured according to ASTM D1652. A hydroxyl value of the resultant reaction mixture may be at least 40 mgKOH/g (e.g., from 40 mgKOH/g to 300 mgKOH/g, 60 mgKOH/g to 200 mgKOH/g, 80 mgKOH/g to 100 mgKOH/g, etc.), as measured according to ASTM D4274. The hydroxyl value may account for the CME polyol and unreacted hydroxyl groups in the epoxy-reactive component.

According to an exemplary embodiment, the reaction mixture may have full conversion (i.e., a conversion rate of at least 93%) of the epoxy groups to hydroxyl groups when forming the CME polyol. According to exemplary embodiments, the reaction mixture that forms the CME polyol may have a conversion rate of 95% of the epoxy groups to hydroxyl groups and an EEW of at least 9,000 g/eq or a conversion rate of 98.5% of the epoxy groups to hydroxyl groups and an EEW of at least 30,000 g/eq. For example, the full conversion may be demonstrated by gel permeation chromatography (GPC) spectra characterization, which may indicate that the lower molecular weight epoxy component has essentially reacted out resulting in full conversion to the higher molecular weight CME polyol. Full conversion may be demonstrated by Fourier transform infrared (FTIR) spectrometry, which may indicate that the infrared pattern corresponding to the epoxy component is essentially not present or is present in a negligible amount in the infrared pattern corresponding to the CME polyol. Full conversion may be demonstrated by nuclear magnetic resonance spectrometry, which may indicate that the magnetic properties pattern corresponding to the epoxy component is essentially not present or is present in a negligible amount in the magnetic properties pattern corresponding to the CME polyol.

To form the polyurethane product (e.g., a gel polyurethane), a reaction mixture that includes the isocyanate-reactive component and the isocyanate component is formed. The isocyanate-reactive component includes at least the CME polyol and may optionally include at least one other polyol, which form the polyol component of the isocyanate-reactive component. The at least one other polyol may be a polyether polyol or a polyester polyol. The at least one other polyol may have a petroleum based building block (e.g., propylene oxide, ethylene oxide, and/or butylene oxide) or a natural oil derived building block. For example, a propylene oxide based polyether (such as one available under the tradename VORANOL™ from The Dow Chemical Company) and/or a natural oil derived polyol (such as castor oil) may be used in the isocyanate-reactive component. According to exemplary embodiments, a propylene oxide-glycerine based polyol, a poly(tetramethylene ether) glycol based polyol, a polypropylene glycol based polyol, and/or a polybutadiene based polyol may be used in the isocyanate-reactive component. For example, the isocyanate-reactive component may include at least 25 wt % of the at least one other polyol, with a remainder based on a total of 100 wt % being the CME polyol. For example, the isocyanate-reactive component may include from 40 wt % to 75 wt % of the CME polyol and 25 wt % to 60 wt % of a propylene oxide based polyether (such as a propylene oxide-glycerine based polyol). According to an exemplary embodiment, the polyol component that includes the CME polyol and the at least one other polyol may have a low water absorbency measured as less than 0.8 wt % (e.g., less than 0.7 wt %) increase in weight of the polyol component at the conditions of 62% humidity and 23° C.

The isocyanate component includes at least one isocyanate such as diphenylmethane diisocyanate (MDI), toluene diisocyanate (TDI), m-phenylene diisocyanate, p-phenylene diisocyanate (PPDI), naphthalene diisocyanate (NDI), isophorone diisocyanate (IPDI), hexamethylene diisocyanate (HDI), and various isomers and/or derivatives thereof. Using at least one of its 2,4'-, 2,2'-, and 4,4'-isomers, MDI may have a polymeric, a copolymer, a mixture, or a modified polymer form. Exemplary MDI products are available from The Dow Chemical Company under the trade names ISONATE, PAPI, and VORANATE. Using at least one of its 2,4 and 2,6-isomers, TDI may have a polymeric, a copolymer, a mixture, or a modified polymer form. Exemplary TDI products are available from The Dow Chemical Company under the trade name VORANATE.

The isocyanate-reactive component may be reacted with the isocyanate component at an isocyanate index from 60 to 200 (e.g., 60 to 120, 80 to 150, 90 to 120, 100 to 115, etc.). For example, to make soft gel type elastomers the isocyanate index may be from 60 to 120. The isocyanate index is measured as the equivalents of isocyanate in the reaction mixture for forming the polyurethane product, divided by the total equivalents of isocyanate-reactive hydrogen containing materials in the reaction mixture, multiplied by 100. Considered in another way, the isocyanate index is the ratio of isocyanate-groups over isocyanate-reactive hydrogen atoms present in the reaction mixture, given as a percentage.

The optional additive component of the reaction mixture for forming the polyurethane product may be in its entirety or partially mixed with the isocyanate component and/or the isocyanate-reactive component. According to an exemplary embodiment, a portion of the optional additive component is added to the isocyanate-reactive component before the reaction mixture is formed and another portion is separately added to the reaction mixture.

The optional additive component may include an optional catalyst component that includes at least one catalyst. Exemplary catalysts include tertiary amines, Mannich bases formed from secondary amines, nitrogen-containing bases, alkali metal hydroxides, alkali phenolates, alkali metal alcoholates, hexahydrothiazines, and organometallic compounds. The viscosity of the isocyanate component may be reduced by the mixing diluents therewithin, e.g., diluents that are commercially available and are known to those skilled in the art may be used. Various other additives, e.g., those known to those skilled in the art, may be included in the optional additive component. For example, fillers such as inorganic and/or organic fillers, coloring agents, water-binding agents, surface-active substances, plant protection agents, extenders and/or plasticizers may be used. Optional chain extenders and/or crosslinkers may be used to modify the structure of the CME polyol.

Dyes and/or pigments (such as titanium dioxide and/or carbon black), may be included in the optional additive component to impart color properties to the polyurethane product. Pigments may be in the form of solids or a dispersion in a resin carrier. Reinforcements (e.g., flake or milled glass and/or fumed silica), may be used to impart certain properties. Other additives include, e.g., UV stabilizers, antioxidants, air release agents, and adhesion promoters, which may be independently used depending on the desired characteristics of the polyurethane product.

According to exemplary embodiments, the polyurethane product (e.g., that includes polyurethane elastomers) may be formed by reacting the isocyanate-component with the isocyanate-reactive component to form a reaction product and curing the reaction product. The polyurethane product produced using the CME polyol may deform under pressure (i.e., reduce pressure points by redistribution of the pressure) and return to its initial state after the deformation causing pressure is removed. According to exemplary embodiments, the polyurethane product is a polyurethane gel or a viscoelastic polyurethane foam. The polyurethane product may have a density from $0.2 \text{ kg/m}^3$ to $2 \text{ kg/m}^3$ (e.g., $0.2 \text{ kg/m}^3$ to $1.3 \text{ kg/m}^3$, etc.). The production of the polyurethane products may be carried out, e.g., in a mold or poured into a sheathing (such as of an elastic, flexible film, or an elastic coated textile sheet material).

According to exemplary embodiments, polyurethane elastomers may be used in gel cushions in shoes, in seating surfaces (such as sofas, chairs, car seats, and bicycle seats), in back supporting surfaces (such as beds, headrests, and armrests), protection gear (such as supports and coverings for various parts of the body), bandages and dressings, as self-adhesive/sealing materials on surfaces (such as for concrete, asphalt, and cement).

All percentages are by weight, unless indicated otherwise. All values for molecular weight are based on number average molecular weight, unless indicated otherwise.

EXAMPLES

The following materials are used:

D.E.R.™ 383 An aromatic epoxy resin that is a reaction product of epichlorohydrin and bisphenol A, having an epoxide equivalent weight of approximately 183 g/eq (available from The Dow Chemical Company).

D.E.N.™438 A novolac epoxy resin that is a epichlorohydrin and phenol-formaldehyde novolac in methyl ethyl ketone, having an epoxide equivalent weight of approximately 176-181 g/eq (available from The Dow Chemical Company).

CNSL A cashew nutshell liquid that includes 94 wt % of cardonal (available from Hua Da SaiGao [i.e., HDSG of Beijing] Technology).

Catalyst A A catalyst that includes 70 wt % ethyltriphenylphosphonium acetate in methanol (available from Alfa Aesar).

VORANOL™CP 450 A polyether polyol that is a glycerine propoxylated triol, having a number average molecular weight of 450 and a nominal hydroxyl number of 370-396 mg KOH/g (available from The Dow Chemical Company).

PAPI™ 27 An isocyanate of polymeric diphenylmethane diisocyanate, having an isocyanate content of 31.4 wt % (available from The Dow Chemical Company).

Phenol A 99 wt % solution of phenol (available from Sigma-Aldrich).

Firstly, a CME PolyolA is prepared by mixing D.E.R.™383 with CNSL. In particular, approximately 330 grams of CNSL is added to a 4-necked round bottom flask (equipped with thermometer, mechanical stirrer and nitrogen connection), which flask includes approximately 182 grams of D.E.R. 383, to form a reaction mixture for forming the CME polyol A. In the reaction mixture, a ratio of epoxy groups in the D.E.R™ 383 to epoxy reactive hydroxyl groups in the CNSL is approximately 1:1.05. Then, the flask is thoroughly purged and protected with nitrogen for 10 minutes. Next, agitation of the reaction mixture within the flask is started at room temperature and approximately 0.26 grams of Catalyst A is added into the reaction mixture, during which time period agitation is continued and heat is applied to the reaction mixture. Once a temperature of 160° C. is reached, that temperature is maintained for four hours. Thereafter, nitrogen protection is continued until the reaction mixture has cooled to 40° C.

Next, properties of the resultant CME Polyol A are measured. In particular, the CME Polyol A is measured as having an epoxide equivalent weight of approximately 31,283 g/eq (as measured according to ASTM D1652) and a hydroxyl value of approximately 123 mgKOH (as measured according to ASTM D4274 D). Further, GPC spectra characterization, FTIR spectrometry, and/or nuclear magnetic resonance spectrometry may be performed.

Secondly, CME Polyol B and CME Polyol C are prepared by mixing D.E.R.™ 383 with CNSL, using the method described above with respect to CME Polyol A. Working Example 1 includes CME Polyol B, which is prepared using a 1:2 ratio of D.E.R.™ 383 to CNSL, i.e., a 1:1 ratio of epoxy groups in the D.E.R™ 383 to epoxy reactive hydroxyl groups in the CNSL. Comparative Example A includes CME Polyol C, which is prepared using a 1:1 ratio of D.E.R.™ 383 to CNSL, i.e., a 1:0.5 ratio of epoxy groups in the D.E.R™ 383 to epoxy reactive hydroxyl groups in the CNSL. Polyurethane gel elastomers for Working Example 1 and Comparative Example A are prepared by mixing the respective CME polyols B and C with PAPI™ 27 at an isocyanate index of 1.05. CME polyol properties, reaction mixture properties, and polyurethane gel properties are shown below in Table 1.

TABLE 1

| | Working Example 1 | Comparative Example A |
|---|---|---|
| CME Polyol Properties | | |
| Epoxide Equivalent Weight (g/eq) | 32,000 | 727 |
| Epoxide Group Content (%) | 0.14 | 6.05 |
| Hydroxyl Group Content (%) | 3.6 | 2.6 |
| Reaction Mixture Properties | | |
| Gel Time (hours) | 2.5 | >48 |
| Polyurethane Gel Properties | | |
| Shore Hardness | 60D | range from 0A to 50D |
| Hardness distribution | uniform | non-uniform |

With respect to Table 1, above, the epoxide equivalent weight and the epoxide group content are measured according to ASTM D-1652 and the hydroxyl group content is measured according to ASTM D-4274 D. The gel time is measured as the time after the components are mixed in a mold, which mold is a plastic transparent drinking cup having a volume of 200 mL, that the resultant elastomers lose fluidity (i.e., when tilting of the mold does not result in displacement of the reaction product). Hardness is measured with a shore durometer according to ASTM 2240-05, after post-heating for three hours at 75° C. and subsequent cooling to room temperature. The hardness distribution is visually inspected after removing the samples from the molds. Comparative Example A demonstrates a non-uniform distribution where the hardness decreases from a Shore A hardness of 0 at the top of the sample to a Shore D hardness of 50 at the bottom of the sample.

Thirdly, water absorbance comparisons are conducted using 1:1 mixtures of a CME polyol with VORANOL™CP 450 to show a low water absorbency (i.e., less than 0.8% increase in weight of a polyol component at the conditions of 62% humidity and 23° C.) can be achieved using a combination polyol. Comparative Example B is prepared using VORANOL™ CP 450 (V-450), without any CME polyol. Working Example 2 is prepared using a mixture of CME Polyol A and VORANOL™ CP 450. Working Example 3 is prepared using CME Polyol D and Working Example 4 is prepared using CME Polyol E, which CME Polyol D and E are prepared using the method described above with respect to forming CME Polyol A. In this regard, CME Polyol D is prepared similar to CME Polyol A, except Phenol is added to the CNSL. In particular, CME Polyol D is prepared using 165 grams of CNSL, 52 grams of Phenol, and 182 grams of D.E.R.™ 383. CME Polyol D has an epoxide equivalent weight of approximately 32,000 and a hydroxyl value of approximately 152. CME Polyol E is prepared using 330 grams of CNSL and 180 grams of D.E.N.™ 438.

Water absorbance comparisons are conducted using two pieces of A4 size printing paper under the conditions of 62% humidity and at 23° C. Two layers of printing paper are clamped by two Teflon® rings and the spreading area of the polyol samples are fixed by the rings to an area of 250 cm². Next, 30 grams of each of Working Examples 2 to 4 and Comparative Example B are independently dipped onto the printing paper and spread out on the 250 cm² area inside Teflon® rings. After 1 hour, the samples are weighed to measure weight increase percent value, as shown below in Table 2.

TABLE 2

| | Working Example 2 (1:1 weight ratio of CME Polyol A:V-450) | Working Example 3 (1:1 weight ratio of CME Polyol D:V-450) | Working Example 4 (1:1 weight ratio of CME Polyol E:V-450) | Comparative Example B (100 wt % V-450) |
|---|---|---|---|---|
| Weight Increase (%) | 0.69 | 0.63 | 0.67 | 1.83 |

The invention claimed is:

1. A reaction system for forming polyurethane elastomers, the reaction system comprising:
   an isocyanate-reactive component that includes a cardanol-modified epoxy polyol that is a reaction product of an epoxy component and an epoxy-reactive component at a ratio of epoxy groups to epoxy reactive groups from 1:0.95 to 1:5, the epoxy-reactive component including a cashew nutshell liquid having a cardanol content of at least 85 wt %, based on a total weight of the cashew nutshell liquid, and the cardanol-modified epoxy polyol having an epoxide equivalent weight of at least 8,000 g/eq, and
   an isocyanate component that includes at least one polyisocyanate.

2. The reaction system as claimed in claim 1, wherein the cardanol content in the cashew nutshell liquid is from 90 wt % to 99 wt % and a cardol content in the cashew nutshell liquid is from 0.5 wt % to 8 wt %, based on the total weight of the cashew nutshell liquid.

3. The reaction system as claimed in claim 1, wherein the epoxy component includes from 90 wt % to 100 wt % of at least one epoxy resin having from two to four epoxide moieties per molecule, based on a total weight of the epoxy component.

4. The reaction system as claimed in claim 1, wherein the isocyanate-reactive component includes from 40 wt % to 75 wt % of the cardanol-modified epoxy polyol and from 25 wt % to 60 wt % of a propylene oxide based polyether polyol, based on a total weight of the isocyanate-reactive component.

5. The reaction system as claimed in claim 1, wherein the epoxy-reactive component includes a phenol, a molar ratio of the cashew nutshell liquid to the phenol being from 0.5:1.5 to 1.5:0.5.

6. The reaction system as claimed in claim 1, wherein the epoxy-reactive component includes a naphthol based compound, and a molar ratio of the cashew nutshell liquid to the naphthol based compound being from 0.5:1.5 to 1.5:0.5.

7. The reaction system as claimed in claim 1, wherein the epoxy-reactive component includes a phenylphenol based compound, and a molar ratio of the cashew nutshell liquid to the phenylphenol based compound being from 0.5:1.5 to 1.5:0.5.

8. The reaction system as claimed in claim 1, wherein the epoxy-reactive component includes a hexachlorophene based compound, and a molar ratio of the cashew nutshell liquid to the hexachlorophene based compound being from 0.5:1.5 to 1.5:0.5.

9. The reaction system as claimed in claim 1, wherein an isocyanate index of the reaction system is from 60 to 200.

10. A polyurethane foam product comprising a product of the reaction system claimed in claim 1.

11. A gel polyurethane comprising a product of the reaction system claimed in claim 1.

12. A method of preparing polyurethane elastomers, the method comprising:

reacting the isocyanate-reactive component with the isocyanate component in the reaction system claimed in claim 1 to form a reaction product, and curing the reaction product to form polyurethane elastomers.

* * * * *